No. 763,756. Patented June 28, 1904.

UNITED STATES PATENT OFFICE.

BENNO HOMOLKA, OF FRANKFORT-ON-THE-MAIN, AND JOSEF ERBER, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

PROCESS OF REACTING ON NITRAMINS WITH FORMALDEHYDE AND A PRODUCT THEREOF.

SPECIFICATION forming part of Letters Patent No. 763,756, dated June 28, 1904.

Application filed April 13, 1904. Serial No. 202,974. (No specimens.)

*To all whom it may concern:*

Be it known that we, BENNO HOMOLKA, residing at Frankfort-on-the-Main, and JOSEF ERBER, residing at Höchst-on-the-Main, Germany, both citizens of the Empire of Germany, have invented certain new and useful Improvements in the Manufacture of Products of Condensation of Primary Aromatic Nitramins with Formaldehyde, of which the following is a specification.

G. Pulvermacher has shown (*Ber. d. d. Chem. Ges.*, XXV, 2/62) that the three nitranilins in alcoholic solution with formaldehyde yield yellow to orange-yellow products of condensation, according to the equation:

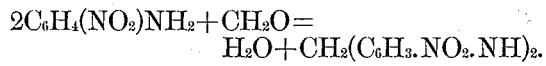

$$2C_6H_4(NO_2)NH_2 + CH_2O = H_2O + CH_2(C_6H_3.NO_2.NH)_2.$$

These products of condensation have now been recognized as valuable lake dyestuffs, and it was desirable to substitute for their tedious and expensive manufacture in alcoholic solution a cheaper and more handy method.

We have found that the products of condensation of nitranilins and their homologues, especially of nitrotoluidins with formaldehyde, may be easily obtained if the aldehyde is allowed to act on the aqueous solution of a salt, preferably the hydrochlorid of nitramin. This result was not to be foreseen, as various products are obtained according to the action of formaldehyde on aromatic amins occurring in neutral, acid, or alkaline solution.

The process may be illustrated, for instance, as follows: 30.5 kilograms of nitrotoluidin (melting-point 107° centigrade, $CH_3:NH_2:NO_2 = 1:2:4$) are stirred with the quantity of hydrochloric acid requisite to form a salt, whereupon sufficient water is gradually added to dissolve the hydrochlorid obtained. To this solution is slowly run, with stirring, eight kilograms of formaldehyde of forty-per-cent. strength, preferably diluted with some water. The beautifully yellow product of condensation separates at once. It is collected on a filter, washed, and dried by gently heating or made into a paste, as desired. The product thus obtained is insoluble in water, little soluble in organic solvents, and melting at 230° centigrade.

If in the above example for nitrotoluidin be substituted the equivalent quantities of nitranilin the known compounds of Pulvermacher are produced, whereas by applying the isomeric nitrotoluidins also more or less vivid-colored products are obtained—thus, for instance, from orthonitroparatoluidin an orange-yellow product melting at 185° centigrade, from nitroörthotoluidin ($CH_3:NH_2:NO_2 = 1:2:5$) a lemon-yellow product melting at 254° centigrade.

Having now described our invention, what we claim is—

1. The herein-described process for the manufacture of products of condensation of primary aromatic nitramins with formaldehyde, which consists in allowing formaldehyde to act on the aqueous solutions of salts of nitramins, substantially as set forth.

2. As new substance, the product of reaction of formaldehyde on nitroörthotoluidin $CH_3:NH_2:NO_2 = 1:2:4$, melting-point 107° centigrade, being a yellow crystalline powder melting at 230° centigrade, insoluble in water, almost insoluble in the usual organic solvents, soluble in hot glacial acetic acid.

In testimony that we claim the foregoing as our invention we have signed our names in presence of two subscribing witnesses.

BENNO HOMOLKA.
JOSEF ERBER.

Witnesses:
 ALFRED BRISBOIS,
 JOSEPH FLACH.